the following

United States Patent Office 3,036,120
Patented May 22, 1962

3,036,120
DICARBOXYLIC ACID DERIVATIVES OF TETRACYCLINE AND ITS ANALOGS
Henry F. Hammer, Seaford, and Charles I. Jarowski, Massapequa Park, N.Y., and Frederick J. Pilgrim, Cincinnati, Ohio, assignors to Chas. Pfizer & Co. Inc., Brooklyn, N.Y., a corporation of Delaware
No Drawing. Filed Nov. 10, 1958, Ser. No. 772,701
7 Claims. (Cl. 260—501)

Our present invention is concerned with a process for the preparation of carboxylic acid mono esters of tetracycline antibiotic compounds and with novel half acid esters and their salts, which have been thus prepared. This application is a continuation-in-part of our application Serial No. 450,788 filed August 18, 1954, now abandoned, and of our previously copending application Serial No. 598,765, filed July 19, 1956, now abandoned.

In these prior applications the mono esters produced by the present process, disclosed and claimed in this and in applications Serial No. 450,788 and 598,765, were indicated to be 12a-esters. That is the hydroxyl group at the 12a-position of the tetracycline antibiotics was thought to be esterified in the products obtained. It has since been found that this structural designation is in error. The same products are therefore claimed herein in terms of the process for their production.

It has also since been found that analogous mono esters can be prepared from the recently reported 6-deoxytetracycline, 6-deoxyoxytetracycline, 6-demethyltetracycline, 6-demethylchlortetracycline, and 6-demethyl-6-deoxytetracycline. Procedures for the preparation of these tetracycline antibiotic compounds are to be found in J. Am. Chem. Soc., vol. 79, 1957, pp. 4561–4563, ibid., vol. 80, 1958, p. 5324, and in South African patent application 512/58.

One of the disadvantages of the tetracycline antibiotic compounds, such as oxytetracycline, chlortetracycline, tetracycline, and their biologically active analogs, is their rather low solubility in water at pH's from slightly acid to slightly basic, that is when these compounds are in their amphoteric form. Such tetracycline antibiotic compounds are generally less stable at substantially acid and basic pH's where their aqueous solubility is more appreciable. An object of our present invention is to overcome the disadvantages of low aqueous solubility at slightly acidic to slightly basic pH's by preparing esters of the tetracycline antibiotic compounds, which are more water-soluble under these conditions. A further object is to provide a new and improved process for the preparation of the mono esters. Yet another object is to prepare novel dicarboxylic hydrocarbon half acid mono esters of tetracycline antibiotic compounds, and their salts, which are capable of yielding useful blood levels in the body and affording animals protection against infections caused by organisms sensitive to such antibiotic compounds. Additional objects will appear from the following description of our invention.

In an earlier co-pending application, Serial No. 415,691, filed on March 11, 1954, by Philip N. Gordon, now U.S. Patent 2,812,349 granted November 5, 1957, there was described a method for the preparation of certain carboxylic acid esters of the tetracycline antibiotics. The process of our present invention has certain definite advantages over that earlier process with respect to speed of the reaction, volumes of materials employed and purity of the products obtained.

We have found that monocarboxylic acid esters of tetracycline antibiotic compounds may be prepared in a most convenient fashion by contacting such antibiotic compounds with a hydrocarbon carboxylic acid anhydride in a liquid N-alkyl lower alkanoic acid amide, such as an N-alkyl substituted acetamide or formamide. Preferably the N-alkyl substituents contain from one to four carbon atoms as in the case of N,N-dimethylacetamide, N-ethylacetamide, and N,N-dimethylformamide. In general, the preferred amides have a total of from about two to about eight carbon atoms in their molecules. While the new reaction products are referred to herein as monoesters, their structure has not been established. Any one of the reactive hydrogen atoms of the parent antibiotic theoretically could be replaced by the esterifying acyl group. It is probable that one of the hydroxyl groups is esterfied by the present process. It is considered an equally likely possibility, however, that the esterifying group becomes attached to the carboxamide nitrogen atom in the 2-position to provide an imide. Since this is a matter of speculation, however, the term mono esters will be employed in referring to the present substances.

The tetracycline antibiotic compounds useful as starting materials in our new process and for the preparation of our novel products are first of all the well known antibiotics oxytetracycline, chlortetracycline and tetracycline. They also include various active derivatives of these antibiotics, particularly their 4-desdimethylamino analogs (in which the dimethylamino group at the 4-position of the tetracycline molecule is replaced by a hydrogen atom), and their 5a,6-anhydro analogs (in which the hydroxyl group at the 6-position and a hydrogen atom at the 5a-position of the tetracycline molecule are removed leaving a double bond between these positions). Of course, one may also employ as starting materials the acid addition salts of these tetracycline antibiotic compounds (excepting the 4-desdimethylamino analogs), particularly those with mineral acids, such as sulfuric acid, hydrochloric acid and hydrobromic acid.

The carboxylic acid anhydrides of acids having up to eleven carbon atoms are generally useful in our new process. When using anhydrides of monocarboxylic acids, one obtains products which are identical with some of those described in above-mentioned U.S. 2,812,349 of Philip N. Gordon. These monocarboxylic acid esters have valuable properties, but the novel dicarboxylic half acid monoesters of our present invention are superior, particularly in respect of the blood levels in the body and animal protection against various infections afforded thereby. Generally our novel esters are active antimicrobial agents useful for inhibition of microorganisms contaminating various materials. They may be used for disinfecting such substances and for other such purposes as decreasing bacterial contamination of mold cultures. These monoesters possess a high degree of solubility in water at approximate neutrality. They are, of course, present in the form of salts at such pH's, and a great variety of salts may be prepared. These include salts of the tetracycline moiety which is amphoteric (except in the case of the desdimethylamino analogs) and salts of the dicarboxylic hydrocarbon half acid ester moiety. The alkali metal salts of the latter are preferred due to their excellent solubility in water. It is also possible to form such salts with aliphatic amines, including substituted aliphatic amines, and the araliphatic amines.

Among the carboxylic acid anhydrides that may be used in our process are the various aliphatic hydrocarbon, aromatic hydrocarbon, heterocyclic, cycloaliphatic hydrocarbon, and araliphatic hydrocarbon acid anhydrides of acids having up to about 11 carbon atoms. The monocarboxylic acid anhydrides include acetic anhydride, propionic acid anhydride, butyric acid anhydride and valeric acid anhydride. When the acid anhydride used is a hydrocarbon dicarboxylic acid anhydride, the product that is formed is a new and particularly useful material.

Among the dicarboxylic acid anhydrides which may preferably be used in our process are those of maleic, succinic, phthalic, glutaric, and adipic acids. Also useful are those of itaconic, citraconic, dimethylmaleic, α-methylsuccinic, α,α-dimethylsuccinic, α,β-dimethylsuccinic, α,β-diethylsuccinic, α-ethylglutaric, β-ethylglutaric, α-n-butylglutaric, phenylsuccinic, α-phenylglutaric, benzylsuccinic, tetrahydrophthalic, 1,2-cyclohexanedicarboxylic, 1-carboxy-1-cyclohexane acetic and homophthalic acids.

When the process of our present invention is operated, it is desirable to use a temperature of from about 10° C. to about 35° C. Room temperature, that is about 15°–25° C., is quite suitable. Under the conditions of this process, the esterification reaction is generally completed in a few hours, although it can take up to about two days. Often the monocarboxylic acid ester begins to form within a few minutes. The reaction varies somewhat with the temperature, the concentration of the reagents used and the nature of the acid reagent. In general, at least about one molecular proportion of the acid anhydride is used per molecular proportion of the antibiotic compound. An excess is not harmful. Sufficient liquid N-substituted alkyl lower alkanoic acid amide is used to give an easily handled, fluid mixture. The tetracycline antibiotic compounds are quite soluble in these amides.

The novel dicarboxylic hydrocarbon half acid monoesters of tetracycline antibiotic compounds obtainable by our new process may, as previously indicated, form a great variety of novel salts in either or both of the carboxylic acid or tetracycline moieties. Such salts may be formed not only with metals (e.g. alkali metals—sodium, potassium, lithium; alkaline earth metals, calcium, barium, magnesium; and others) and ammonia but also with various organic bases, particularly the aliphatic amines, including the simple aliphatic amines, such as methylamine, ethylamine, butylamine and triethylamine, the substituted aliphatic amines, such as ethanolamine and triethanolamine, esters thereof, such as procaine [2-(diethylamino)ethyl p-aminobenzoate], and the aralliphatic amines, such as benzylamine, phenothylamine, dibenzylethylenediamine and N-benzyl-N'-(4-hydroxy-3-ethoxybenzyl)ethylenediamine. As would be expected, the formation of salts with certain metals or organic bases may considerably alter the solubility properties of the dicarboxylic hydrocarbon half acid monoesters of a tetracycline antibiotic compounds. Furthermore, acid salts of the half acid esters may be formed by addition to the 4-dimethylamino group on the tetracycline moiety where such group is present. For this purpose, one may use various acids, including mineral acids and strong organic acids, among which may be mentioned hydrochloric, hydrobromic, sulfuric, phosphoric and toluene sulfonic acids. Such acid addition salts may be somewhat difficult to prepare and rather unstable in the case of the half-acid esters formed with the stronger dicarboxylic acids, such as maleic.

The novel products of the present invention are obtained as colorless or pale yellow solids, often crystalline. Generally, the salts of the half acid esters of the tetracycline antibiotic compounds are pale to bright yellow in color, whereas the free acid esters are very light in color. In some cases the product is precipitated from the reaction mixture by a non-solvent, such as ether. Redissolution in a solvent such as a lower alcohol and precipitation with ether often yields a purer product. Alternatively, the crude product is dissolved in a dilulte alkali and precipitated with acid. The new products have the same general type of utility as the corresponding tetracycline antibiotic compounds themselves. Many of the products have an appreciable activity against a variety of gram-positive and gram-negative microorganisms. This is particularly true of the products prepared from tetracycline, oxytetracycline, and chlortetracycline. Furthermore, some of our novel compounds have been shown to be readily absorbed upon injection into animals and to be non-irritating when so injected. They result in appreciable levels of antimicrobial activity in the blood of the animals permitting the successful treatment of certain infections.

The following examples are given by way of illustration and are not to be considered as the sole embodiments of this invention. It is to be understood that protection hereof is only limited by the scope of the appended claims.

EXAMPLE I

*Oxytetracycline Hydrogen Maleate*

Oxytetracycline dihydrate base (20 g.) was dissolved in commercial N,N-dimethylformamide (100 ml.) and maleic anhydride (20 g.) was added to the dark red solution. The reaction mixture was then stirred for two hours at room temperature under an atmosphere of nitrogen. Separation of crystalline material began after about 15 or 20 minutes. The product was filtered off on a Buchner funnel, pressed as dry as possible and then washed thoroughly with acetone. The product was slurried with acetone and refiltered. The excess solvent was removed at 0.1 mm. of mercury pressure and at room temperature. The yield of almost colorless crystalline product was 10.3 g.

*Analysis.*—Calcd. for: $C_{26}H_{26}N_2O_{12}\cdot H_2O$: C, 54.17; H, 4.90; N, 4.86; $H_2O$, 3.12. Found: C, 54.62; H, 5.13; N, 5.12; $H_2O$, 2.00 (micro Karl Fischer).

Bioassay: 27 mcg./mg. using *Klebsiella pneumoniae*. Ultraviolet peaks at 270 and 360 m$\mu$, infrared peak at 5.8$\mu$.

EXAMPLE II

*Oxytetracycline Hydrogen Succinate*

A solution of oxytetracycline dihydrate base (10 g.) and succinic anhydride (10 g.) in N,N-dimethylformamide (50 ml.) was allowed to stand at room temperature for 48 hours. Crystals began to appear at the end of 12 hours. The ester was recovered by filtration and washed throughly with acetone until the washings were colorless. The product, freed of excess solvent at reduced pressure, weighed 1.5 g.

Anal. bioassay: 12.5 mcg./mg. using *Klebsiella pneumoniae*. Ultraviolet peaks at 210, 272 and 360 m$\mu$ (in aqueous sodium bicarbonate), infrared peak at 5.8$\mu$.

EXAMPLE III

*Tetracycline Hydrogen Maleate*

(*a*) N,N-dimethylformamide (125 ml.) was added to a mixture of amphoteric tetracycline trihydrate (25 g.) and maleic anhydride (25 g.). The mixture was shaken for five or ten minutes and then filtered. The material that precipitated from the filtrate was filtered off after about one hour, washed throughly with chloroform and then ether. The yield of colorless, crystalline tetracycline hydrogen maleate was 4.5 g. Some additional product is obtained from the mother liquor.

(*b*) N,N-dimethylformamide (40 ml.) was added to a mixture of anhydrous amphoteric tetracycline (10 g.) and maleic anhydride (10 g.). When shaken, a clear solution resulted; and crystals precipitated in twenty minutes. Yield: 4.0 g.

Bioassay: 45 mcg./ml. against *Klebsiella pneumoniae*. Ultraviolet peaks of aqueous bicarbonate solution at 275 and 362 m$\mu$; infrared peak at 5.8$\mu$.

*Anaylsis.*—Calcd. for $C_{26}H_{26}N_2O_{11}\cdot H_2O$: C, 55.75; H, 5.04; N, 5.00; $H_2O$, 3.21. Found: C, 55.94; H, 5.26; N, 5.25; $H_2O$, 2.71 (micro Karl Fischer).

EXAMPLE IV

*Tetracycline Hydrogen Succinate*

Anhydrous tetracycline (53 g.) and succinic anhydride (53 g.) were suspended in N,N-dimethylformamide. After stirring at room temperature for 5 hours, solution was complete. The mixture was allowed to stand overnight and then was poured into 2.5 liters of chloroform. When no more material precipitated, the solid was filtered and washed with ether. The colorless tetracycline hydrogen succinate weighed 38 g.

Bioassay: 45 mcg./mg. against *Klebsiella pneumoniae*. Ultraviolet peaks of aqueous bicarbonate solution at 275 and 362 m$\mu$; infrared peak at 5.8$\mu$.

EXAMPLE V

Chlortetracycline Hydrogen Maleate

N,N-dimethylformamide (5 ml.) was added to a dry mixture of anhydrous recrystallized chlortetracycline (1 g.) and maleic anhydride (1 g.). When shaken, complete solution occurred; and in about twenty minutes, crystallization commenced. The crystals were filtered off after two hours, washed with chloroform, ether and finally acetone. After being freed of solvent in a vacuum-drying oven, crystalline chlortetracycline maleate was obtained. Yield: 0.4 g.

Anal. bioassay: 165 mcg./mg. vs. *Klebsiella pneumoniae*. Ultraviolet peaks of aqueous sodium bicarbonate solution at 278 and 370 m$\mu$; infrared peak at 5.8$\mu$.

EXAMPLE VI

Oxytetracycline Hydrogen Phthalate

Oxytetracycline dihydrate base (1 g.) and phthalic anhydride (1.5 g.) were dissolved in N,N-dimethylformamide (5 ml.) and allowed to stand at room temperature for two days. The crystals that formed were filtered off and washed with acetone. 0.1 g. of crystalline oxytetracycline hydrogen phthalate was obtained.

Anal. bioassay: 110 mcg./mg. against *Klebsiella pneumoniae*. Infrared peak at 5.8$\mu$; red color with concentrated sulfuric acid.

EXAMPLE VII

Oxytetracycline Nicotinate

A mixture of anhydrous oxytetracycline (0.5 g.) and nicotinic anhydride (0.5 g.) was dissolved in N,N-dimethylformamide (2 ml.) and was allowed to stand overnight. Nicotinic acid separated and was filtered off. The product was then precipitated from the filtrate with ether. The yield of amorphous material was about 0.35 g.

Anal. bioassay: 30 mcg./mg. against *Klebsiella pneumoniae*. Uutraviolet peaks of a methanol solution 264 and 376 m$\mu$.

EXAMPLE VIII

Oxytetracycline Acetate

A solution of oxytetracycline dihydrate base (1.0 g.) and acetic anhydride (1.0 g.) in N,N-dimethylformamide (5 ml.) was permitted to stand at room temperature for two days. The reaction mixture was concentrated at reduced pressure, and treated with water. The yellow product was recovered by filtration, washed well with water and then dissolved in chloroform. The addition of hexane caused the acetate to reprecipitate.

Anal. bioassay: 100 mcg./mg. against *Klebsiella pneumoniae*; red color with concentrated sulfuric acid. Infrared peak at 5.7$\mu$.

EXAMPLE IX

Monopotassium Salt of Oxytetracycline Hydrogen Maleate

Oxytetracycline hydrogen maleate was dissolved in sufficient 5% aqueous potassium bicarbonate solution so that there was slightly more than one mole of bicarbonate present. The half acid ester dissolved and then an immediate precipitate of crystalline material formed, which was filtered off and washed with 5% bicarbonate solution.

Analysis.—Calcd. for $C_{26}H_{25}N_2O_{12}K \cdot 2H_2O$: C, 49.36; H, 4.62; N, 4.43; K, 6.18. Found: C, 49.75; H, 4.45; N, 4.66; K, 6.32.

Bioassay: 21 mcg./mg. against *Klebsiella pneumoniae*. In exactly the same manner the monosodium salt was formed.

EXAMPLE X

Dipotassium Salt of Oxytetracycline Hydrogen Maleate

Oxytetracycline hydrogen maleate (60 g.) was suspended in water. pH meter electrodes were inserted in the suspension, and, with vigorous agitation, 4.7% aqueous potassium hydroxide was added dropwise at a rapid rate. The pH rose slowly from 3.0 to 8.0 when complete solution was attained after the addition of 204 ml. of alkali. A plot of pH vs. ml. of alkali reveals a break in the curve at pH 6.7. After filtration, the solution of oxytetracycline dipotassium maleate was lyophilized to yield 60 g. of yellow, powdery, amorphous product.

EXAMPLE XI

Monoprocaine Salt of Oxytetracycline Hydrogen Maleate

Oxytetracycline hydrogen maleate (2.8 g.) was suspended in ethyl alcohol (7.5 ml.) and mixed with a solution of procaine base (1.2 g.) in alcohol, (7.5 ml.). Water was added until solution occurred. The yellow, slightly alkaline solution was charcoaled, filtered and then lyophilized to produce a dry, powdery, water-soluble salt.

EXAMPLE XII

The procedures described in Examples IX and X were repeated using tetracycline hydrogen maleate in place of oxytetracycline hydrogen maleate and the mono- and dipotassium salts of tetracycline hydrogen maleate were thus obtained.

EXAMPLE XIII

The preparation of Example VI was repeated using N,N-dimethylacetamide in place of the substituted formamide. The oxytetracycline hydrogen phthalate was isolated as a solid product.

EXAMPLE XIV

Anhydrotetracycline was mixed with an equal weight of maleic anhydride in five times its weight of N-ethylacetamide. The mixture was stirred several hours at 20° C. and the ester product (anhydrotetracycline hydrogen maleate) was isolated.

EXAMPLE XV

Desdimethylaminooxytetracycline was dissolved in ten parts by weight of N-propylformamide. One half part by weight of succinic anhydride was added. After the mixture had stood overnight at room temperature the product was isolated. The solid pale yellow product (desdimethylaminooxytetracycline acid succinate) is active against various gram-negative and gram-positive organisms.

EXAMPLE XVI

Chlortetracycline Hydrogen Succinate

Anhydrous chlortetracycline (0.5 g.) was dissolved in N,N-dimethylformamide and treated with succinic anhydride (0.5 g.). Eventually, a clear solution was obtained. The ester was precipitated with chloroform and worked up in a manner similar to that employed for tetracycline hydrogen succinate.

Bioassay: 53 mcg./mg. against *Klebsiella pneumoniae*. Ultraviolet peaks of an aqueous sodium bicarbonate solution at 217, 270 and 372 m$\mu$; infrared peak at 5.8$\mu$.

EXAMPLE XVII

The procedure of Example I is repeated substituting the anhydrides of the following acids for succinic anhydride: glutaric, adipic, itaconic, citraconic, dimethylmaleic, $\alpha$-methylsuccinic, $\alpha,\alpha$-dimethylsuccinic, $\alpha,\beta$-diethylsuccinic, $\alpha$-ethylglutaric, $\beta$-ethylglutaric, $\alpha$-n-butylglutaric, phenylsuccinic, $\alpha$-phenylglutaric, benzyl succinic, tetrahydrophthalic, 1,2-cyclohexane dicarboxylic, 1-carboxy-1-cyclohexane acetic, and hemophthalic.

EXAMPLE XVIII

The procedure of XI is repeated substituting methylamine, ethylamine, butylamine, triethylamine, ethanolamine, triethanolamine, benzylamine, phenethylamine, dibenzylethylenediamine, and N-benzyl-N'-(4-hydroxy-3-ethoxy-benzyl)ethylenediamine for the procaine specified in that experiment. In those instances, for instance with some of the higher molecular weight amines, where a water insoluble product results, it can be collected by filtration.

EXAMPLE XIX

*Calcium Salt of Oxytetracycline Hydrogen Maleate*

Oxytetracycline hydrogen maleate, 5.6 g., is suspended in a 5% aqueous solution containing 1.1 g. of calcium chloride, and the acidity adjusted to pH 6.7 by the addition of dilute aqueous sodium hydroxide. The calcium salt of oxytetracycline hydrogen maleate is recovered, for instance, by filtration after first concentrating the solution if necessary, by conventional means. The magnesium and barium salts are produced in analogous fashion.

EXAMPLE XX

*Ammonium Salt of Oxytetracycline Hydrogen Succinate*

Oxytetracycline hydrogen succinate is treated with an excess of methanolic ammonia. The ammonium salt is recovered from the reaction medium by filtration or by simply evaporating the solvent.

EXAMPLE XXI

The hydrochloride salt of oxytetracycline hydrogen succinate is prepared by treating a methanolic solution thereof with anhydrous hydrogen chloride. The product is recovered by either filtration or evaporation or a combination thereof.

The p-toluenesulfonate salt is prepared in a similar fashion except that an excess beyond one mole proportion of the acid is avoided to eliminate contamination of the final product with the excess acid.

EXAMPLE XXII

*6-Deoxyoxytetracycline Hydrogen Maleate*

The procedure of Example I is repeated substituting 6-deoxyoxytetracycline for the oxytetracycline used therein.

EXAMPLE XXIII

*6-Deoxytetracycline Hydrogen Maleate*

The procedure of Example III is repeated substituting 6-deoxytetracycline for the tetracycline used therein.

EXAMPLE XXIV

*6-Demethyltetracycline Hydrogen Maleate*

The procedure of Example III is repeated substituting 6-demethyltetracycline for the tetracycline used therein.

EXAMPLE XXV

*6-Demethylchlortetracycline Hydrogen Maleate*

The procedure of Example III is repeated substituting 6-demethylchlortetracycline for the tetracycline used therein.

EXAMPLE XXVI

*6-Demethyl-6-Deoxytetracycline Hydrogen Maleate*

The procedure of Example III is repeated substituting 6-demethyl-6-deoxytetracycline for the tetracycline used therein.

We claim:
1. The monoacyl compound obtained by reacting a tetracycline antibiotic compound selected from the group consisting of tetracycline, oxytetracycline, chlortetracycline, 5a,6-anhydro-5-oxytetracycline, 5a,6-anhydrotetracycline, 5a,6-anhydrochlortetracycline, 6-deoxy-5-oxytetracycline, 6-deoxytetracycline, 6-demethyltetracycline, 6-demethylchlortetracycline, 6-demethyl-6-deoxytetracycline, the acid addition salts of each of the aforesaid tetracycline antibiotic compounds, 4-desdimethylamino-5-oxytetracycline, 4-desdimethylaminochlortetracycline and 4-desdimethylaminotetracycline with at least one molar proportion of a carboxylic acid anhydride of an acid selected from the group consisting of alkane, alkene, aromatic hydrocarbon, cycloaliphatic hydrocarbon and aralkane hydrocarbon dicarboxylic acids having up to about 11 carbon atoms; the alkali metal, alkaline earth metal and ammonium salts of each of said reaction products; the amine salts of each of said reaction products wherein the salt forming amine is selected from the group consisting of methylamine, ethylamine, butylamine, triethylamine, ethanolamine, triethanolamine, procaine, benzylamine, phenethylamine, dibenzylethylenediamine, and N-benzyl - N' - (4 - hydroxy-3-ethoxybenzyl) ethylenediamine; and the mineral acid and toluene sulfonic acid salts of each of said reaction products having a 4-dimethylamino substituent on the tetracycline antibiotic compound moiety thereof, said reaction being carried out at a temperature of from about 10° C. to about 35° C. and said tetracycline antibiotic compound reactant being dissolved in a liquid N-alkyl lower alkanoic acid amide.
2. The monopotassium salt of the compound of claim 1 wherein the antibiotic is oxytetracycline and the carboxylic acid anhydride is maleic acid anhydride.
3. The dipotassium salt of the compound of claim 1 wherein the antibiotic is oxytetracycline and the carboxylic acid anhydride is maleic acid anhydride.
4. The monoprocaine salt of the compound of claim 1 wherein the antibiotic is oxytetracycline and the carboxylic acid anhydride is maleic acid anhydride.
5. The monopotassium salt of the compound of claim 1 wherein the antibiotic is tetracycline and the carboxylic acid anhydride is maleic acid anhydride.
6. The dipotassium salt of the compound of claim 1 wherein the antibiotic is tetracycline and the carboxylic acid anhydride is maleic acid anhydride.
7. The compound of claim 1 wherein the antibiotic is tetracycline and the carboxylic acid anhydride is succinic acid anhydride.

References Cited in the file of this patent

UNITED STATES PATENTS

| 2,783,245 | Weidenheimer et al. | Feb. 26, 1957 |
| 2,812,349 | Gordon | Nov. 5, 1957 |

FOREIGN PATENTS

| 516,567 | Canada | Sept. 13, 1955 |
| 1,097,703 | France | Feb. 23, 1955 |
| 1,098,974 | France | Mar. 16, 1955 |
| 167,750 | Australia | May 25, 1956 |

OTHER REFERENCES

Sidgwich: Organic Chemistry of Nitrogen, The Clarendon Press (Oxford), pages 141–142 (1937).

Degering: An Outline of the Organic Chemistry of Nitrogen, published by University Lithoprinters, page 396 (1950).

Hochstein: J. Am. Soc., vol. 75, p. 5468 (1953).

Schriner et al.: The Systematic Identification of Organic Compounds (4th ed.), published by John Wiley and Sons, Inc., (New York), page 72 (1956).